Patented Feb. 27, 1923.

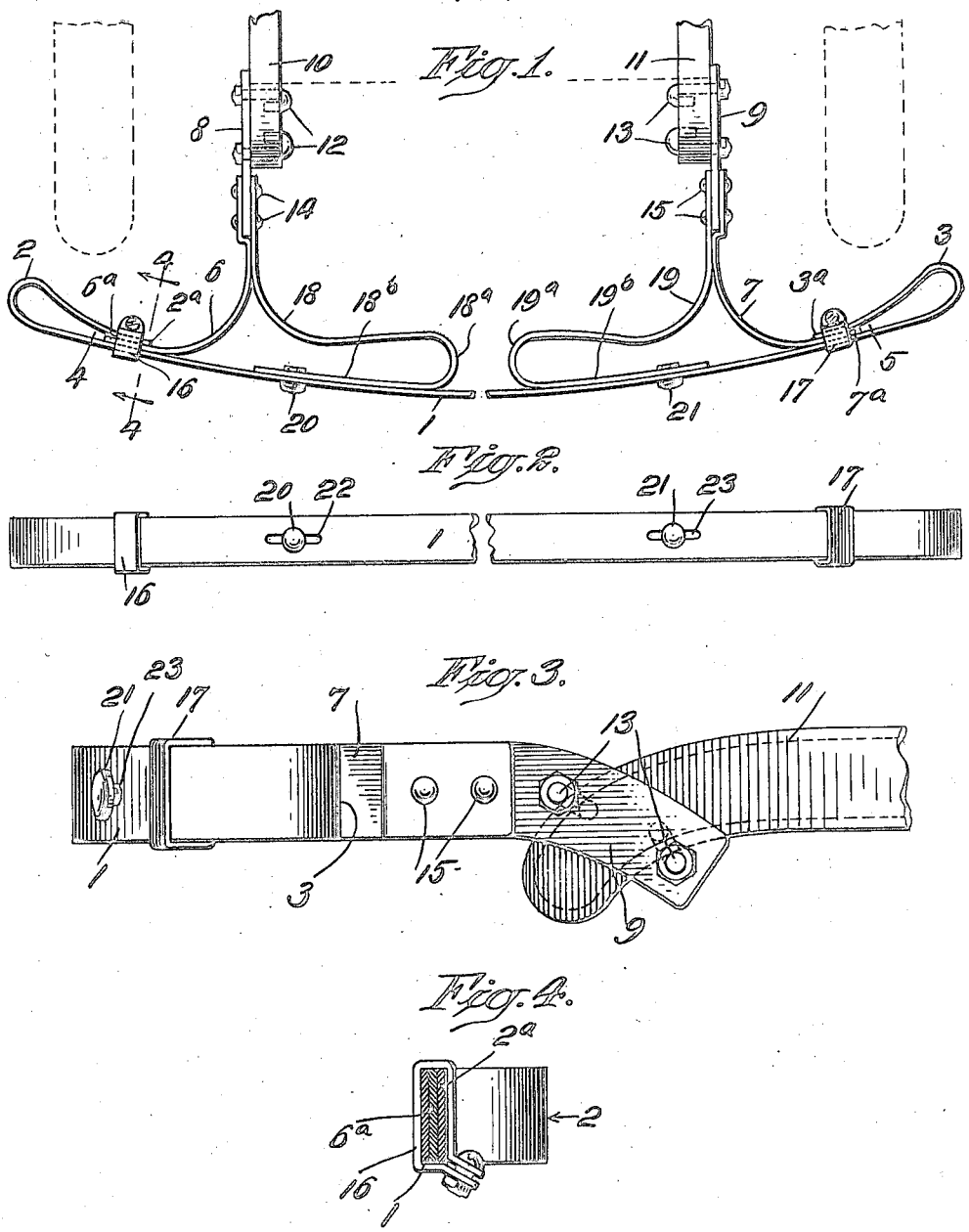

1,446,490

UNITED STATES PATENT OFFICE.

FREDERICK A. WERNIG, OF BROOKLYN, NEW YORK.

AUTOMOBILE BUMPER.

Application filed July 13, 1921. Serial No. 484,317.

*To all whom it may concern:*

Be it known that I, FREDERICK A. WERNIG, a citizen of the United States, and a resident of the borough of Brooklyn, county of Kings, and State of New York, have invented certain new and useful Improvements in Automobile Bumpers, of which the following is a specification.

This invention relates to improvements in automobile bumpers.

One of the objects of this invention is to provide an automobile bumper of improved construction which may be formed conveniently of resilient spring steel strips and which will be attractive in appearance as well as efficient and durable.

Another object is to permit ready adjustment of the parts to cars of varying types and sizes and having different widths of frames.

Another object of my invention is to provide a bumper of the spring loop type which will enable adjustment for varying widths of cars without detracting from the appearance of the bumper.

Another object of my invention is to produce a bumper in which a forwardly-bowed resilient contact member is supported by relatively rigid spring connection members contiguous to its opposite ends which have direct contact therewith without the interposition of loops or the like, and the intermediate portion between such relatively rigid supporting members is backed up and reinforced by looped spring members whereby the central portion of the bumper which is more often subjected to shocks is more resiliently supported and reinforced than the opposite ends of the bumper.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a top or plan view of an automobile bumper embodying my invention;

Fig. 2 is a front elevation of the bumper shown in Fig. 1;

Fig. 3 is a side view of one end of the bumper; and

Fig. 4 is a section on the line 4—4 of Fig. 1.

Referring now to these drawings, which illustrate a preferred embodiment of my invention, 1 indicates an impact bar which, as shown, is curved or bowed forwardly and extends transversely across the front of the car and beyond the wheels thereof. The opposite terminal portions of the bar 1 are bent to form integral return loops 2 and 3. The ends $2^a$—$3^a$ of such terminal loop portions extend inwardly toward the middle and forwardly toward the inner surface of the bar 1, the said terminal ends preferably being disposed adjacent to the said inner surface of the bar 1 to permit the formation of channels 4 and 5 respectively between such terminal ends and the inner surface of said bar 1.

Said impact bar 1 is supported contiguous to its opposite ends in horizontal position by connecting bars 6 and 7 which are connected at their inner ends to bracket bars 8 and 9 respectively, which are in turn connected to the sills 10 and 11 of the chassis by bolts 12 and 13. These bracket bars 8 and 9 extend directly outward parallel to the sills 10 and 11 and substantially at a right angle to the impact bar 1, and the connecting bars 6 and 7 respectively, which are preferably connected to said brackets 8 and 9 by rivets 14 and 15, extend from substantially the plane of said bracket bars 8 and 9 in outwardly-disposed lateral curves until the terminal ends $6^a$—$7^a$ thereof extend into the channels 4 and 5 respectively formed between the terminal ends $2^a$—$3^a$ of the return loops 2 and 3 and the inner surface of the contact bar 1.

It will be apparent that an impact bar so mounted may be adjusted on the outwardly curved bars 6 and 7 to permit attachment of the bumper to cars having varying widths of body, and this adjustment may be accomplished without detracting from the ornamental and finished appearance of the impact bar 1. The abutting terminal ends of the bars 6 and 7 and the impact bar 1 are preferably securely connected together by straps 16 and 17 respectively.

It will also be apparent that a very neat connection is formed between the supporting or connecting bars 6 and 7 and the impact bar 1 and that a bar so supported at its opposite ends is exceedingly flexible and would in the event of a collision of great intensity at or about the middle portion thereof tend to be unduly bent inwardly at such middle portion and in bending would to a considerable degree swing about the straps 16 and 17 as fulcrums. While such flexibility is very desirable to a certain extent it is important that the impact bar 1 and the bars 6 and 7 be not bent into permanent deformation, and I therefore preferably reinforce the middle portions of the impact bar 1 by means of spring loop members 18 and 19 respectively which are fastened to and extend from the sides of the bracket bars 8 and 9 opposite to that on which the bars 6 and 7 are fastened and are thence curved inwardly toward the middle of the car body into loops 18$^a$—19$^a$ with return portions 18$^b$—19$^b$ abutting against the inner surface of the impact bar 1, and preferably fasten thereto by button head rivets 20—21 extending, as shown, through slots 22—23 in the impact bar 1. The curved inwardly extending portion of the loop member 18 is preferably spaced a suitable distance from its terminal portion which abuts against the impact bar and the parts are so arranged that when a collision strain of extraordinary force is imposed on the middle of the impact bar, it will be taken up and absorbed by the impact bar and the terminal members 18$^b$—19$^b$ of the loop members 18 and 19 respectively, and if the strain is great enough, it will be further resiliently resisted by the primary arms 18 and 19 of the respective loop members.

The operation of the bumper will be apparent from the foregoing description.

Having described my invention, I claim:—

1. An automobile bumper embodying an impact bar having integral loop portions at its opposite ends, said loops terminating adjacent to the inner surface of the impact bar adjacent to said outer end, straps extending around the impact bar and the terminal portions of the loop and forming a channel, supporting members movable within said channel to adjustably support the impact bar adjacent to its outer ends.

2. An automobile bumper embodying an impact bar having integral loop portions at its opposite ends, said loops terminating adjacent to the inner surface of the impact bar adjacent to said outer end, straps extending around the impact bar and the terminal portions of the loop and forming a channel, connecting members extending within said channel and curved to extend substantially at right angles to said impact bar and means for fastening said connecting members to the automobile body.

3. An automobile bumper embodying an impact bar having integral loop portions at its opposite ends, said loops terminating adjacent to the inner surface of the impact bar adjacent to said outer end, straps extending around the impact bar and the terminal portions of the loop and forming a channel, connecting members extending within said channel and curved to extend substantially at right angles to said impact bar, bracket bars secured to said connecting members at one end and to the automobile body at the opposite end.

4. An automobile bumper embodying an impact bar having integral loop portions at its opposite ends, said loops terminating adjacent to the inner surface of the impact bar adjacent to said outer end, straps extending around the impact bar and the terminal portions of the loop and forming a channel, connecting members extending within said channel and curved to extend substantially at right angles to said impact bar, bracket members secured to said connecting members at one end and to the automobile body at the opposite end and means at the opposite side of said connecting members for reinforcing the impact bar between the points of support thereof.

5. An automobile bumper embodying an impact bar having integral loop portions at its opposite ends, said loops terminating adjacent to the inner surface of the impact bar adjacent to said outer end, straps extending around the impact bar and the terminal portions of the loop and forming a channel, connecting members extending within said channel and curved to extend substantially at right angles to said impact bar, bracket bars secured to said connecting members at one end and to the automobile body at the opposite end, loops extending in a direction opposite to the connecting members and having terminal portions abutting against the impact bar to resiliently reinforce the middle portion of the impact bar against shock and means for fastening said terminal loop portion to the impact bar between the points of support thereof.

6. An automobile bumper embodying an impact bar having integral loop portions at its opposite ends, said loops terminating adjacent to the inner surface of the impact bar adjacent to said outer end, straps extending around the impact bar and the terminal portions of the loop and forming a channel, connecting members extending within said channel and curved to extend substantially at right angles to said impact bar, bracket bars secured to said connecting members at one end and to the automobile body at the opposite end, loops extending in a direction opposite to the connecting members and having terminal portions abutting against the impact bar to resiliently reinforce the middle portion of the impact bar against shock, means for fastening said terminal loop portion to the impact bar between the points of support thereof, the said loop being disposed to have its inner arm spaced from the terminal abutting portions of the said loop and the impact bar.

In witness whereof, I have signed my name to the foregoing specification in the presence of two subscribing witnesses.

FREDERICK A. WERNIG.

Witnesses:
HELEN V. WHIDDEN,
JULIUS H. LENTZ.